United States Patent [19]

Sakano

[11] Patent Number: 4,805,120

[45] Date of Patent: Feb. 14, 1989

[54] TWO-COLOR IMAGE RECORDER

[75] Inventor: Yukio Sakano, Tokyo, Japan

[73] Assignee: Ricoh Company, Ltd., Tokyo, Japan

[21] Appl. No.: 183,084

[22] Filed: Apr. 19, 1988

[30] Foreign Application Priority Data

Apr. 23, 1987 [JP] Japan ................................. 62-100794

[51] Int. Cl.[4] ............................................ G01D 15/00
[52] U.S. Cl. .................................... 364/519; 346/157
[58] Field of Search ................................ 364/518–523; 358/300; 346/154, 160, 157; 400/119

[56] References Cited

U.S. PATENT DOCUMENTS 4,745,576  5/1988  Hasegawa et al. .................... 364/519
4,746,941  5/1988  Pham et al. .......................... 364/519

Primary Examiner—Arthur G. Evans

Attorney, Agent, or Firm—Oblon, Fisher, Spivak, McClelland & Maier

[57] ABSTRACT

A two-color image recorder for reproducing a black and a red image component of an original document on a single paper includes a scanner which sequentially performs a first reading operation which omits the red component and a second reading operation which does not omit it. Image data produced by the first reading operation are written in an image memory. While an image data control unit delivers processed image data to a laser printer, the laser printer prints them out by performing an electrophotographic process two consecutive times with a single paper. A plurality of filters each having a different spectral characteristic are selectively brought into an optical path defined in the scanner by filter selecting means.

8 Claims, 8 Drawing Sheets

TWO-COLOR IMAGE RECORDER

BACKGROUND OF THE INVENTION

The present invention relates to a two-color image recorder such as a two-color digital copier.

Copiers known in the art include an automatic two-color digital copier capable of reproducing, for example, a red image component of an original document in distinction from a black image component which is printed on the white background of the document together with the red component. Specifically, this kind copier is generally constituted by a scanning section and a printing section. The scanning section includes two reading means which are operable at the same time for reading an image, and at least one of the reading means has a function of reading an image while omitting an image component of particular color (i.e. by regarding it identical with the background) by means of a color separating filter or the like. Image data outputted by the two reading means are processed by signal processor means to distinguish the image data associated with the particular color from the other data, e.g. black/white image data. These two kinds of data are fed at the same time to the printing section which is operable with the principle of electrophotography and is provided with, for example, a red and a black developing unit. As a result, a two-color copy is produced by a developing process which is effected in each of the different colors with a single paper. That is, the copier adopts a two-color simultaneous reading and two-color simultaneous developing system.

A problem with the above-described prior art digital copier is that the two reading means installed in the scanning section make the structure of the scanning section and therefore that of the entire apparatus complicated while increasing the cost.

Generally, the color component other than the black and white components of a two-color original document is not limited to a red component. In the case that such a document is subjected to two-color copying and that one of the reading means includes a filter which is transparent for red only, the copier sometimes determines that the image component of particular color other than red is either the black component or the white background. Then, the copier fails to reproduce the document as a two-color copy, i.e., it fails to faithfully read the actual conditions of the document.

SUMMARY OF THE INVENTION

It is therefore an object of the present invention to provide a two-color digital copier or like two-color image recorder capable of automatically reproducing a two-color copy with a simple and inexpensive construction which eliminates the need for the two-color simultaneous reading and two-color simultaneous developing principle.

It is another object of the present invention to provide a two-color digital copier or like two-color image recorder capable of producing a two-color copy by a first and a second reading operations without the particular color being limited to a single color.

An apparatus for recording an image component of a first color and an image component of a second color which are printed on an original document of the present invention comprises image reading and processing means for sequentially performing a first reading operation for reading the image component of the first color only and a second reading operation for reading both the image of the first color and the image of the second color, and converting the image components individually into bilevel image data, memory means readable and writable in synchronism with the first and second reading operations of the image reading and processing means for storing the bilevel image data which are produced by the first reading operation of the image reading and processing means, and data control means for logically processing the bilevel image data produced by the first reading operation of the image reading and processing means, the bilevel image data produced by the second reading operation, and the bilevel image data stored in the memory means to extract and produce bilevel data which are associated with the second color.

BRIEF DESCRIPTION OF THE DAWINGS

The above and other objects, features and advantages of the present invention will become more apparent from the following detailed description taken with the accompanying drawings in which.

DESCRIPTION OF THE PREFERRED EMBODIMENTS

Figure 1:
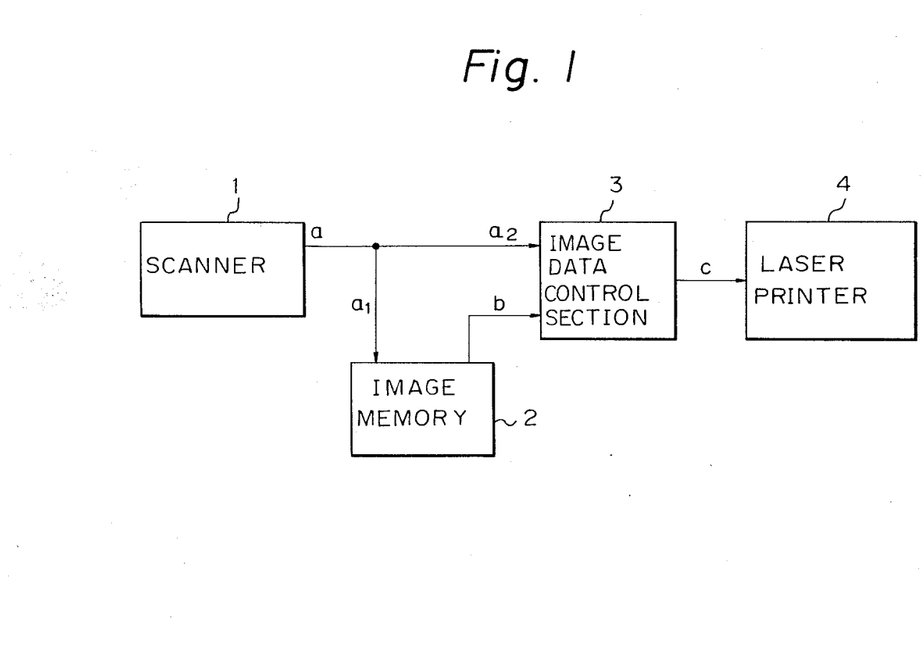
FIG. 1 is a schematic block diagram showing a two-color digital copier which is representative of an image recorder embodying the present invention.

Referring to FIG. 1 of the drawings, a two-color digital copier embodying the present invention is shown in a schematic block diagram. The copier includes a scanner 1 for reading an original document which is laid on a glass platen or the like. The scanner 1 scans the document in a main scanning direction by a CCD (charge coupled device) line sensor or like photoelectric transducer and scans it in a subscanning direction by moving the CCD line sensor and the document relative to each other, as described later in detail with reference to FIG. 2 and others. An image processor is built in the scanner 1 to apply correction, modification, binarization and other various kinds of processing to image data which are outputted by the CCD line sensor, so that the image data are converted into a bilevel signal $a$.

An image memory 2 constructed into a RAM (random access memory) serves to store the bilevel image data which are outputted by the scanner 1. An image data control section 3 is adapted to process the bilevel image data by using logics. Here, the bilevel image data from the scanner 1 are represented by $a$, the image data to be stored in the image memory 2 are represented by $a_1$, and the image data to be directly applied to the image data control section 3 are represented by $a_2$. Further, the image data read out of the image memory 2 at a predetermined timing after the image data $a_1$ have been written in the memory 2 and fed to the image data control section 3 together with the image data $a_2$ are represented by $b$. That is, the image data control section 3 performs logic operations with the image data $a$ hd 2 and $b$ to produce image data $c$. The image data $c$ are delivered to a laser printer 4. In response, the laser printer 4 modulates a laser beam to optically write the image data on a photoconductive element to produce an electrostatic latent image. Then, the laser printer 4 effects development, transfer and other electrophotographic steps to produce a copy.

Figure 2:
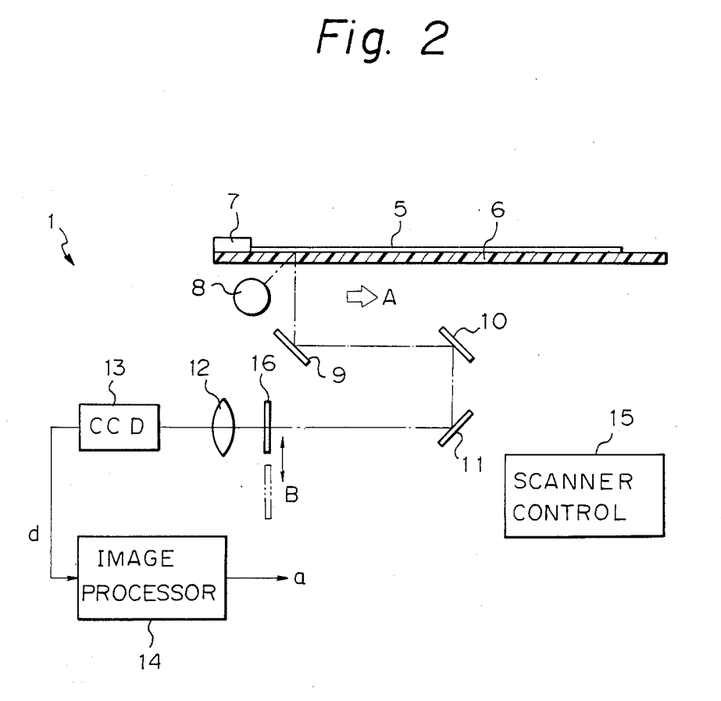
FIG. 2 is a schematic side elevation showing a specific construction of a scanner which is included in the copier of FIG. 1.

FIG. 2 shows a specific construction of the scanner 1. An original document 5 is laid on a glass platen 6. Located at one end or reference end of the glass platen 6 is a white reference plate 7 which defines a reference position for the document 5 and, at the same time, joins in data reading which is adapted for shading correction of a CCD line sensor 13. Optics is disposed below the glass platen 6 and includes a light source 8, a first, a second and a third mirror 9, 10 and 11, respectively, and a lens 12. The optics is constructed to focus imagewise light which is reflected by the document 5 onto the CCD line sensor 13 the main scanning direction of which is perpendicular to the sheet surface of FIG. 2. The light source 8 and first mirror 9 are constructed into a first scanning body which is movable from a reference position along the underside of the glass platen 6 as indicated by an arrow A and at a predetermined velocity v for subscanning. The second and third mirrors 10 and 11, respectively, are constructed into a second scanning body which is movable in the same direction at a different velocity v/2 from the velocity v. This kind of optical scanning system is well known in the art. Defined on the CCD line sensor 13 are, for example, 5000 dot-like pixels which are arranged in the main scanning direction. These pixels are sequentially and electrically scanned in the main scanning direction. Image data $d$ produced by the CCD line sensor 13 on a pixel basis are applied to an image processor 14 to be converted into bilevel data $a$ which are the final outputs of the scanner 1. Built in the scanner 1 is a scanner control 15 which interfaces the scanner 1 to the outside, controls the sequence of the scanner 1, and performs other operations.

In this particular embodiment, a filter 16 is provided which is movable in a direction indicated by an arrow B into and out of an optical path which extends toward to CCD line sensor 13, i.e. between the third mirror 11 and the lens 12. Specifically, the filter 16 is transparent for light associated with an image component of particular color such as red. Driven by a filter driver, not shown, the filter 16 is movable between a first or operative position (solid line) where it protrudes into the optical path and a second or inoperative position (phantom line) where it is retracted from the optical path.

Figure 3:
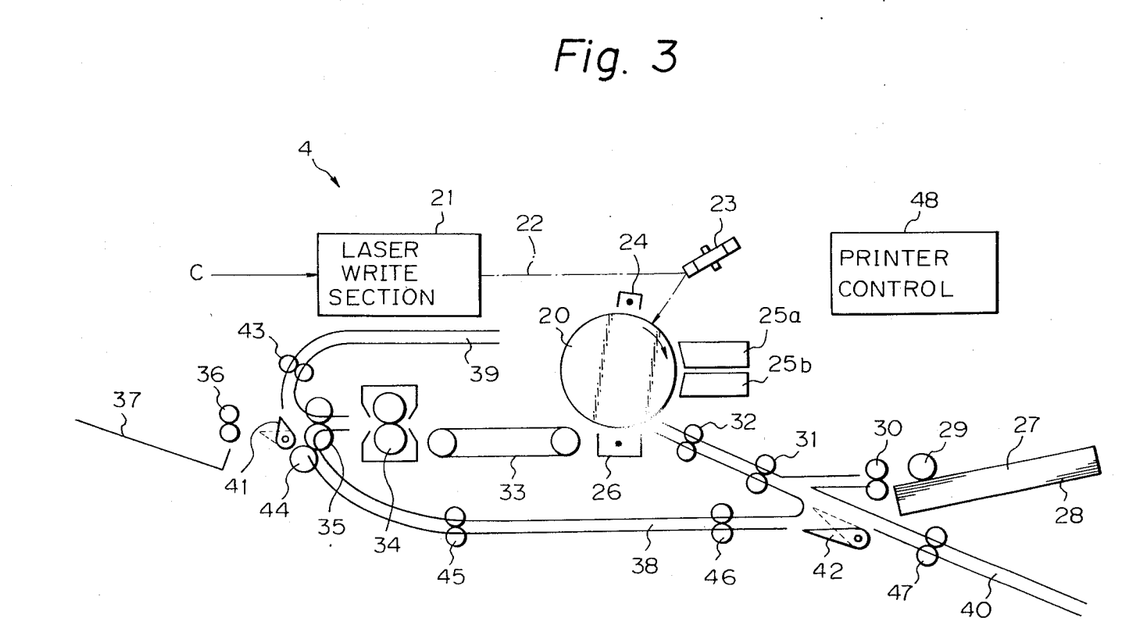
FIG. 3 is a schematic side elevation of a laser printer which is also included in the copier of FIG. 1.

Referring to FIG. 3, a specific construction of the laser printer 4 is shown which adopts an electrophotographic process. As shown, a photoconductive drum 20 is disposed in the printer 4 and rotatable as indicated by an arrow in the figure. Various electrophotographic process devices including a laser writing section 21 are arranged around the drum 20. The laser writing section 21 modulates a laser beam 22 by the image data $c$ which are applied thereto from the image data control section 3. The laser beam 22 so modulated is incident to a certain reflecting surface of a polygon mirror 23 which is rotating in a predetermind direction at a predetermined rate, the laser beam 22 reflected by the mirror 23 scanning the drum 20 along the axis of the latter, i.e., in the main scanning direction. Subscanning is effected by the rotary motion of the drum 20. A charger 24 is located upstream of the position where the drum 20 is scanned as stated above, uniformly charging the drum 20 to a predetermined polarity. By the imagewise exposure effected by the laser writing section 21 and polygon mirror 21, a latent image in the form of dots is electrostatically formed on the drum 20. Two developing means 25a and 25b as well as a transfer charger 26 are sequentially disposed downstream of the above-stated optical wiring station.

A cassette 28 is loaded with a stack of papers 27 while rollers 29 and 30 are associated with the cassette 28 for feeding the papers 27 one at a time. The paper fed out from the cassette 28 is driven by a transport roller pair 31 and a register roller pair 32 at a predetermined timing toward a transfer station adjacent to the drum 20 where the transfer charger 26 is present. The paper 27 to which a toner image has been transferred at the transfer station is transported by a belt 33 to a fixing unit 34 which is located in front of the belt 33. Positioned in front of the fixing unit 34 are rollers 35 and 36 as well as a tray 37. In addition to such a basic transport path, there is defined in the printer a circulartory transport path 38 for implementing a composite copy mode.

Included in the circulatory transport path 38 are a first and a second reversal path 39 and 40, respectively, a first and a second selector pawl 41 and 42, respectively, and a plurality of roller pairs 43, 44, 45, 46 and 47. That is, the circulartory transport path 38 is so looped as to be capable of feeding the paper 27 back to the transfer station of the drum 20. The first reversal path 39 is provided with the roller pair 43, which is reversible in rotating direction, and is defined above and between the discharge rollers 35 and 36. When the first selector pawl 41 is positioned as represented by a solid line in FIG. 3, the paper 27 coming out of the fixing unit 34 is guided by the pawl 41 into the first reversal path 39. As soon as the trailing end of the paper 27 moved away from the discharge roller 35, the roller pair 43 is rotated in the opposite direction to return the paper 27 by a switchback configuration. A substantially horizontal return path is contiguous with the reversal path 39 and forms a part of the circulartory path 38 below the belt 33 and others.

The second reversal path 40 is provided with the roller pair 47, which is also reversible, and contiguous with the paper feed path below the cassette 28. When the paper 27 is returned along the circulartory path 38, the second pawl 42 is positioned as represented by a solid line to guide the paper 27 into the second reversal path 40. As the trailing end of the paper 27 moves away from the pawl 42, the position of the pawl 42 is changed while, at the same time, the roller pair 47 is reversed. As a result the paper 27 is driven back toward the drum 20. Since the paper 27 is reversed twice as stated above, it is fed face up toward the drum 20 by the second feed.

The developing units 25a and 25b store developers, or toner, of different colors which typically are black and red. The developing units 25a and 25b are selectively actuated to develop a toner image which is provided on the drum 20.

A printer control 48 is installed in the laser printer 4 for controlling the sequences of development, transfer, fixing, discharging, reverse paper feed, re-copying, and others.

Figure 4:
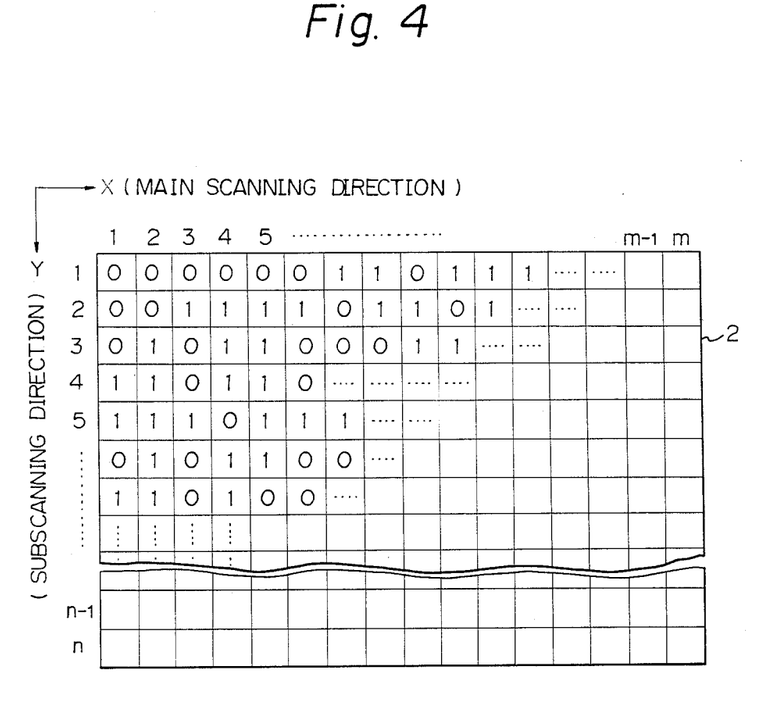
FIG. 4 is a diagram for explaining an image memory.

FIG. 4 shows the construction of the image memory, or RAM, 2. In FIG. 4, the directions indicated by $x$ and $y$ correspond to the main and subscanning directions, respectively. Each $m$ by $n$ block of the memory 2 corresponds to one pixel of image data, i.e. one bit. Logical ZEROs and ONEs are representative of white image components and black image components, respectively. The image data $a_1$ are written in the image memory 2 by being sequentially fed as the main scanning and subscanning of a document proceed. Likewise, the image data are sequentially read out of the image memory 2 as image data $b$ in synchronism with the main scanning and subscanning of the image data $a_2$. While such data reading and writing are controlled by a memory control, not shown, the control for a RAM is attainable with any of known technologies and therefore will not be described in detail to avoid redundancy.

An automatic two-color copy mode achievable with the above construction is as follows. Assume that the document 5 carries a red image component together with a black image component on white background, and that the document 5 is to be reproduced on the paper 27 as a combination of a black/white copy and a red copy. In this condition, the scanner 1 basically reads the document 5 two consecutive times and, likewise, the laser printer 4 performs the electrophotographic process two consecutive times. Image data processing which will be described occurs between such two times of operation. An operator lays the document 5 on the glass platen 6, then selects an automatic two-color copy mode by manipulating an operation board, not shown, and then presses a copy button. Then, the copier automatically performs a sequence of steps so that the paper 27 with the document 5 reproduced in two colors therein is discharged onto the tray 37.

In detail, when the copy button is depressed, the scanner 1 executes a first reading operation. For this operation, the filter 16 which is transparent to red light is brought into the optical path, as shown in FIG. 2. Consequently, among the light reflected by the document 5, the light associated with the red image component is determined to be the same as the white background and therefore transmitted through the filter 16. The CCD line sensor 13 omits red image data (regarding them the same as white data) while reading only black image data as pixels. The scanner 1 beings its scanning operation at the white reference plate 7. After the pixels of the CCD line sensor 13 have been subjected to shading correction, the document 5 is sequentially read on a line-by-line basis through the filter 16 while being sequentially fed in the subscanning direction A. The image data produced by the CCD line sensor 13 during the first scanning are delivered as the image data $a$.

The image data $a$ are fed on one hand to the image memory 2 as image data $a_1$ and on the other hand to the image data control section 3 as image data $a_2$, as previously stated. The image data $a_2$ fed to the image data control section 3 are directly applied to the laser writing block 21 of the laser printer 4, i.e., the image data fed to the laser printer 4 are the image data read but by the CCD line sensor 13. Hence, the image data $c$, $a_2$ and $a$ are identical with each other.

In the laser printer 4 to which the image data $c$ are applied, a first copying operation is executed in parallel with the first reading operation. Specifically, the first developing means 25a, for example, which is assigned to development in black is prepared for development while the second developing means 25a for development in red is maintained unoperable. The laser beam 22 is modulated by the image data $c$ to become incident to the drum 20. The resulting latent image formed on the drum 20 is developed in black by the developing means 25a and, then, the black image is transferred to the paper 27 at the transfer station. The paper 27 carrying the black image therewith is fixed by heat at the fixing unit 34. Driven from the fixing unit 34 toward the discharge side, the paper 27 is guided into the first reversal path 39 by the first pawl 41 which is positioned as shown in FIG. 3. At a predetermined timing, the paper 27 is fed in the opposite direction by the roller pair 43 along the circulartory transport path 38. The second pawl 42 assuming the solid-line position of FIG. 2 forces the paper 27 into the second reversal path 40. Then, at a predetermined timing, the paper 27 is fed in the opposite direction by the roller pair 47 and routed toward the register roller 32 by the pawl 42 which has been switched to the phantom-line position. The paper 27 is now ready to be fed again for another copying cycle with its image surface facing upward.

After the first reading operation, the scanner 1 causes the light source 8 and mirrors 9, 10 and 11 to return in the opposite direction to the direction A to the initial or home position. While they remain in a stand-by condition at the home position after the first reading operation, the filter 16 is retracted from the optical path to the phantom-line position of FIG. 2. On the other hand, the first developing means 25a of the laser printer 4 is deactivated and, instead, the second developing means 25b is activated while, at the same time, the first pawl 41 is switched to the phantom-line position of FIG. 3.

In such a stand-by condition which follows the first reading and first copying, the scanner 1 starts on a second reading operation. Since the filter 16 is absent in the optical path, the document 5 is read with both of its black and red image components regarded by the CCD line sensor 13 as image data which are distinguishable from the white background level. In the second reading operation, as in the first reading operation, the white reference plate 7 and document 5 are sequentially scanned in this order in the main and subscanning directions with the result that image data $a$ are produced by the scanner 1 after necessary image data processing. The image data $a$ are sequentially applied to the image data processing section 3 as image data $a_2$. In synchronism wit such a second reading operation, the image data stored in the image memory 2 during the first reading are sequentially read out to be delivered to the image data processing section 3 as image data $b$.

That the image data are read out of the image memory 2 in synchronism with the second reading operation as stated above means that, assuming the image memory of FIG. 2, image signals associated with the same pixel position are outputted in a predetermined relationship with respect to time. For example, when signal data associated with the position $(x,y)=(3,5)$ of FIG. 4 appears as the image data $a_2$, signal data also associated with the position $(x,y)=(3,5)$ appears as the image data $b$. That is, image data associated with the same pixel of the same document are applied at the same timing to the image data control section 3. Receiving the two different image data $a_2$ and $b$, the image data control section 3 applies logic processing to the same pixel data so as to pick up only those image data which are associated with the red image component. These particular data are fed from the image data control section 3 to the laser printer 4 as image data $c$ which are adapted for the second copying operation.

Figure 5A:
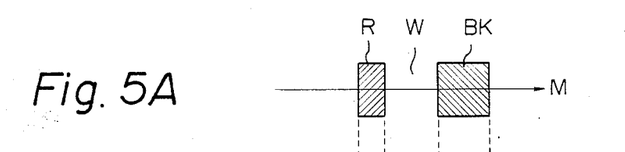
FIGS. 5A to 5F are diagrams representative of two-color image processing.
Figure 5B:
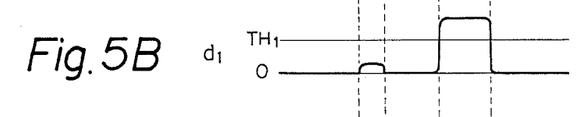
Figure 5C:
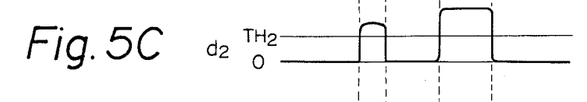
Figure 5D:
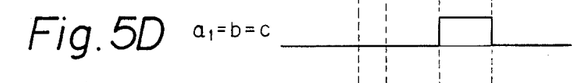

Referring to FIGS. 5A to 5F, there is shown in a diagram the processing for extracting only a red image component out of the document image which contains a black component together with the red component. FIG. 5A shows a certain scanning line M of the document 5 on which a red component R and a black component BK exist together in white background W. When the CCD line sensor 13 reads such a distribution of image components by the first reading operation, it produces a signal $d_1$ as shown in FIG. 5B. Since the filter 16 is used during the first reading operation, that part of the signal $d_1$ which is associated with the red component R is as low in level as the white background W and greatly differs from that part which is associated with the black component BK. When the signal $d_1$ is binarized with respect to a first slice level $TH_1$, the image data $a$ outputted by the scanner 1, which are identical with $a_1$, $b$ and $c$, have a high level in association with the black image BK only, as shown in FIG. 5D.

Figure 5E:
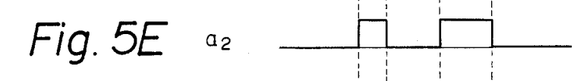
Figure 5F:
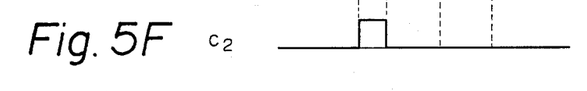

When the image components shown in FIG. 5A are read by the second reading operation in which the filter 16 is retracted from the optical path, an output signal $d_2$ of the CCD line sensor 13 appears as shown in FIG. 5C. This time, the signal level associated with the red component R is higher in the second reading than in the first reading and is close to the signal level which is associated with the black component BK. The signal $d_2$ is binarized with respect to a slice level $TH_2$ which is different from the slice level $TH_1$ resulting in the image data $a$ from the scanner 1 appearing as shown in FIG. 5E. This is also true for the image data $a_2$, i.e., the data signal has a high level in association with both the red component R and the black component BK. The logic operation which the control section 3 should perform for extracting only the image data associated with the red component R out of the mixed data $a_2$ (FIG. 5E) and the black data $b(=a_1)$ (FIG. 5D) stored in the image memory 2 and producing them as image data $c_2$ as shown in FIG. 5F can be implemented with ease.

Figure 6:
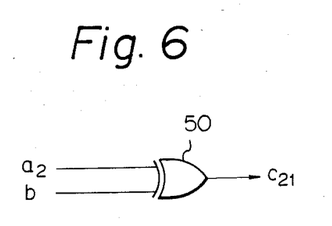
FIG. 6 is a circuit diagram showing a specific construction of an image data control section.

Specifically, the simplest implementation for such extraction is shown in FIG. 6. The implementation of FIG. 6 uses an Exclusive-OR gate 50 the output of which is represented by $c_{21}$. In this case, if any black image data is found during the first reading, it is outputted as it is. During the second reading, only those pixels in which red image data are present are outputted as valid image data.

Figure 7:
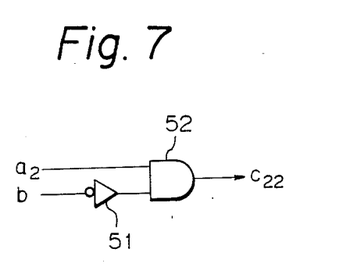
FIG. 7 is a circuit diagram showing another specific construction of the image data control section.

FIG. 7 shows a specific construction of the image data control section 3. As shown, the data read out of the image memory 2 are inverted by an inverter 51 while, as a whole, the image data $c_{21}$ are applied to the laser printer 4 via an AND gate 52.

Figure 8:
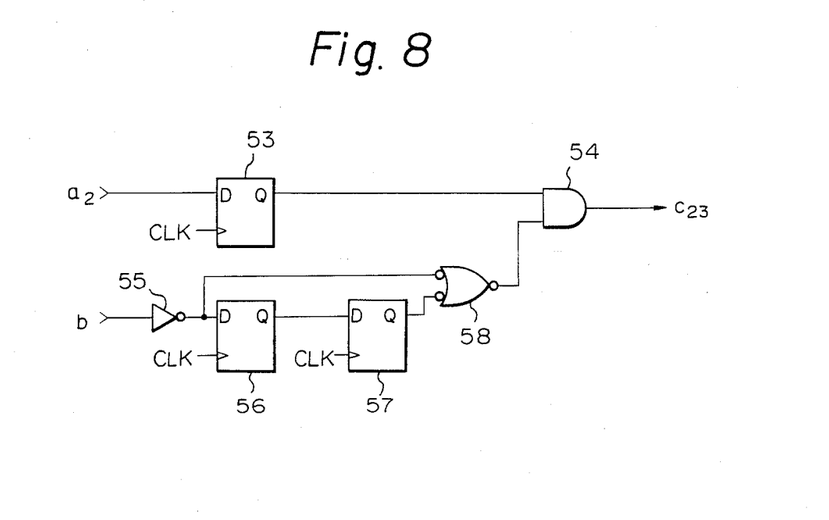
FIG. 8 is a circuit diagram showing a farther specific construction of the image data control section.

Another specific construction of the image data control section 3 is shown in FIG. 8. As shown, the control section 3 includes a flip-flop 53 having an data input terminal D to which the image data $a_2$ from the scanner 1 are applied. The output of the flip-flop 53 is connected to one input of an AND gate 54. A clock CLK is applied to a clock terminal of the flip-flop 53 so that data outputted by the flip-flop 53 has been delayed by one period of the clock CLK. The image data $b$ read out of the image memory 2 are fed directly to an AND gate 58 on one hand and via flip-flops 56 and 57 on the other hand. The output of the AND gate 58 is connected to the other input of the AND gate 54. Consequently, the AND gate 54 produces image data $c_{23}$ which are delivered to the laser printer 4. The clock CLK is also applied to clock terminals of the flip-flops 56 and 57.

In any case, during the second scanning operation, the image data control section 3 produces image data $c$ which are associated with the red component only. These data $c$ are fed to the laser writing section 21 of the laser printer 4 which performs a second copying operation in parallel with the second reading operation. The laser beam 22, therefore, is modulated by the image data $c$ associated with the red component to in turn illuminate the drum 20 imagewise. The resulting latent image on the drum 20 is developed in red by the second developing means $25b$ at the predetermined developing station and then transferred to the paper 27, which is fed again at a predetermined timing by the register roller 32 toward the drum 20. After the image transfer, the paper 27 is transported through the fixing unit 34. At this instant, since the first pawl 41 has been switched to the phantom-line position of FIG. 3, the paper 27 is driven out of the copier onto the tray 37.

The paper 27 on the tray 37 is a faithful reproduction of the document 5 because the black component is reproduced by the first copying and the red component by the second copying on the same surface of the paper 27 as the black component. That is, the prior art two-color simultaneous reading and two-color simultaneous developing system is replaced with a first and second consecutive reading and first and second consecutive developing system which is simpler than the former.

Figures 9A, 9B:
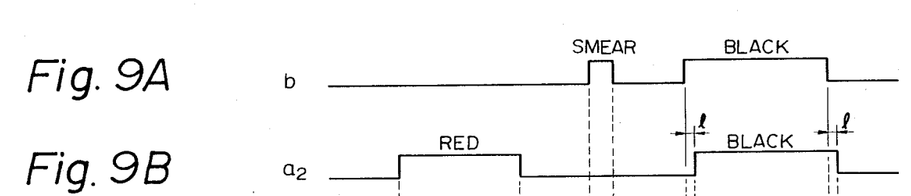
FIGS. 9A to 9F are diagrams representative of image data processing.
Figure 9C:
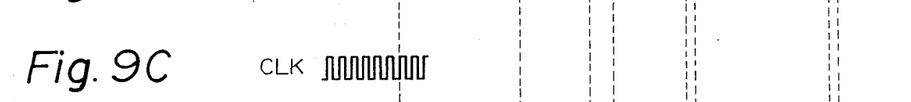
Figure 9D:
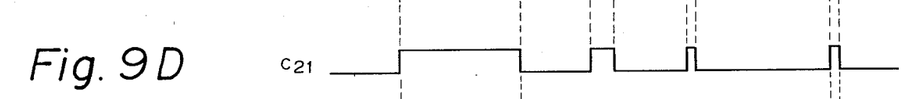
Figure 9E:
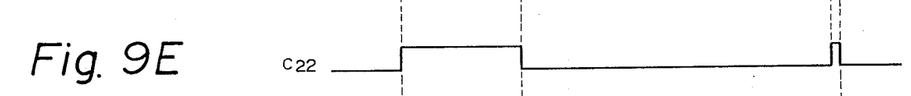

The image data processing assigned to the image data control section 3 will be discussed in further detail. When the image data produced by the first reading operation and those produced by the second reading operation are not coincident with each other as may sometimes occur for one reason or another, the red image data cannot be extracted with accuracy resulting in a reproduction in which colors are deviated from each other. Such an occurrence is represented by FIGS. 9A and 9B. Specifically, assume that the image data $b$ produced by the first reading operation and the image data $a_2$ produced by the second reading operation are deviated by $l$ with respect to timing, and that a smear is included in one of the data such as the data $b$. Should such image data $b$ and $a_2$ be processed by the control section 3 of FIG. 6 which relies on the OR gate 50 only, the image data $c_{21}$ would be produced as shown in FIG. 9D. Consequently, the smear causes the black and red components to be developed one upon another while, at the same time, the deviation causes the edges of an image component to be reproduced in red.

As regards the above point, the control section 3 of FIG. 7 which uses the inverter 51 and AND gate 52 has another problem. Specifically, when the background of an original document is smeared (corresponding to black) and/or when the data produced by the first and second reading operations are deviated from each other, the control section 3 of FIG. 7 can substantially compensate for such an occurrence by inversion so long as the image data $b$ are concerned. However, it renders deviation occurred only in the image data $a_2$ valid as red image data.

Figure 9F:
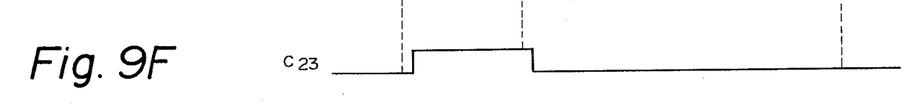

The control circuit 3 implemented by the logic circuit of FIG. 8 is free from the above occurrences. Specifically, when the control circuit 3 of FIG. 8 logically processes the image data $b$ and $a_2$ which are applied thereto, it effects delay processing by using the clock CLK and flip-flops 53, 56 and 57 so as to substantially thicken or thin the image data in the main scanning direction. The resulting image data $c_{23}$ for extracting red appear as shown in FIG. 9F. More specifically, the logic circuit of FIG. 8 applies different delay processing to the image data $b$ read out of the image memory 2 during the first scanning and the image data $a_2$ outputted by the scanner 1 during the second reading with respect to the main scanning direction, so that one image component is thickened or thinned relative to the other image component before applied to the AND gate 54.

In detail, the image data $b$ from the image memory 2 are inverted by the inverter 55 and then fed to the AND gate 57 via the delay route defined by the flip-flops 56 and 57 on one hand and via the direct route on the other hand. This cancels smear data and others included in the black component to broaden the black component. In this manner, the second reading allows only the red image data to be picked up from the AND gate 54 without being effected by the smear and data deviation. This offers a quality two-color reproduction by preventing a black component of an original document from being reproduced in red on a black image or from being fringed in red along its edges.

While the circuitry of FIG. 8 has been described and shown in FIGS. 9A to 9F in relation to the $x$ direction (main scanning direction) only, the delay processing or the like may be similarly applied to the $y$ direction (sub-scanning direction) for the purpose of eliminating deviation of colors and accurately extracting a red component only.

The above description has concentrated on the reproduction of a black and a red image component in black and red, respectively. Alternatively, the laser printer 4 may be constructed to print out an image portion which has been extracted and read as, for example, a red component in a particular color other than red. That is, the particular color to be read and the color to reproduce it do not always have to be identical. This applies to the scanner 1 also, i.e., the particular color does not have to be limited to red. For example, a document may be red by the first reading operation with an image component other than that of any particular color omitted, the image component of the particular color being extracted by way of the second reading operation.

For the above reasons, the filter 16 installed in the scanner 1 and transparent to red light may be replaced with a disk-like filter assembly in which filters each having a different spectral characteristic are radially arranged. Such a filter assembly will be rotated at the time of first reading until one of the filters having a desired spectral characteristic is brought into the optical path. To implement the second reading which does not omit any color component, the filter assembly may be provided with a notch in which no filter is present.

Figure 10:
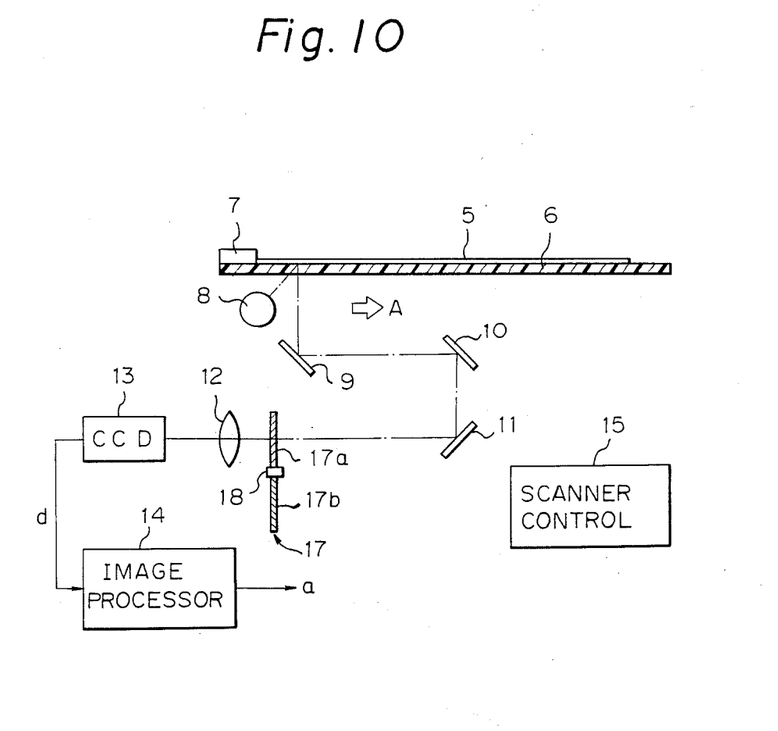
FIG. 10 is a schematic side elevation showing another specific construction of the scanner.

Referring to FIG. 10, a filter assembly 17 having the above-described design is shown and made up of filters 17a, 17b and so on. For example, the filter 17a is transparent to light which is representative of a red component while the filter 17b is transparent to light which is representative of a blue component. The filter assembly is further provided with a sectoral notch or non-filter portion. Having a generally disk-like shape, the filter assembly 17 is rotatale about a shaft 18 which is rotated by a filter driver, not shown, so as to bring the filters 17a, 17b and so on and the non-filter portion selectively into the optical path.

Assume that the document 5 has a black and a blue image component on white background. Then, during the first reading, the blue filter 17 is moved into the optical path to select blue as the particular color. In this case, although the laser printer 4 may be provided with exclusive developing means for development an image in blue, the blue component may alternatively be developed in red. When the document 5 contains an image component other than the red and blue components, all that is required is positioning another filter which is associated with that image component in the optical path.

Of course, the filters 17a, 17b and so on which are arranged in a disk may be replaced with linear filter stripes which are lienarly movable into and out of the optical path. To select any of those different kinds of filters, mode keys or like means which are accessible by an operator may advantageously be provided on an operation board.

In the case that the first and second reading operations which omit or do not omit an image component of particular color by using the filters 17a, 17b and so on are effected, the previously mentioned threshold levels $TH_1$ and $TH_2$ for binarization should preferably be changed on a color basis. This is because as represented by the signal $d_1$ of FIG. 5B the output level of that portion which is associated with the particular color to be omitted is not entirely zero (same as background). Thus, changing the threshold levels $TH_1$ and $TH_2$ filter by filter contributes a great deal to accurate reading.

While the image data $a$ outputted by the scanner 1 via the image processor 14 have been described as comprising simple bilevel data, they may alternatively be subjected to systematic bilevel processing as typified by dither processing in order to include tone information therein.

In summary, it will be seen that the present invention provides a two-color image recorder capable of automatically producing an attractive two-color copy without resorting to a complicated and expensive construction which includes two independent reading means for effecting two-color simultaneous reading and two-color simultaneous developing. In addition, a particular color of a two-color original document to be read exclusively is open to choice so that copy processing which matches with a particular condition of the document is promoted.

Various modifications will become possible for those skilled in the art after receiving the teachings of the present disclosure without departing from the scope thereof.

What is claimed is:

1. An apparatus for recording an image component of a first color and an image component of a second color which are printed on an original document, comprising:
    image reading and processing means for sequentially performing a first reading operation for reading the image component of the first color only and a second reading operation for reading both the image of the first color and the image of the second color, and converting said image components individually into bilevel image data;

memory means readable and writable in synchronism with the first and second reading operations of said image reading and processing means for storing the bilevel image data which are produced by said first reading operation of said image reading and processing means; and data control means for logically processing the bilevel image data produced by the first reading operation of said image reading and processing means, the bilevel image data produced by the second reading operation, and the bilevel image data stored in said memory means to extract and produce bilevel data which are associated with the second color.

2. An apparatus as claimed in claim 1, wherein said image reading and processing means comprises optics for reading the image components of the document by scanning said image components in a main and a sub-scanning direction, and image processing means for converting said image components read by said optics into the bilevel image data.

3. An apparatus as claimed in claim 2, wherein said optics comprises a filter device which is movable into and out of an optical path which is defined in said optics, said filter device being moved into said optical path during the first reading operation.

4. An apparatus as claimed in claim 3, wherein said filter device comprises a plurality of filters each having a different spectral characteristic.

5. An apparatus as claimed in claim 2, wherein said image processing means comprises a charge coupled device line sensor for decomposing the image components read by said optics into pixels in the form of dots.

6. An apparatus as claimed in claim 1, further comprising recording means for recording the bilevel data outputted by said data control means on a paper by developing said bilevel data.

7. An apparatus as claimed in claim 6, wherein said recording means comprises a laser printer for reproducing the bilevel data outputted by said data control means on a paper by peforming an electrophotographic process two consecutive times.

8. An apparatus as claimed in claim 1, wherein the first color is black and the second color is red.

* * * * *